(12) United States Patent
Vokey et al.

(10) Patent No.: US 12,111,232 B2
(45) Date of Patent: Oct. 8, 2024

(54) ZONED ROOF MONITORING SYSTEM

(71) Applicant: DETEC SYSTEMS LLC, Bellingham, WA (US)

(72) Inventors: David Vokey, Bellingham, WA (US); Andrew J. Preiksa, Mount Vernon, WA (US); Mark K. Bridges, Hickory, NC (US); Bryan McGough, Ferndale, WA (US)

(73) Assignee: Detec Systems LLC, Bellingham, WA (US)

( * ) Notice: Subject to any disclaimer, the term of this patent is extended or adjusted under 35 U.S.C. 154(b) by 554 days.

(21) Appl. No.: 17/461,345

(22) Filed: Aug. 30, 2021

(65) Prior Publication Data

US 2023/0069325 A1    Mar. 2, 2023

(51) Int. Cl.
| | |
|---|---|
| *G01M 3/16* | (2006.01) |
| *E04D 11/02* | (2006.01) |
| *E04D 13/00* | (2006.01) |
| *G01K 1/024* | (2021.01) |
| *G01N 27/04* | (2006.01) |
| *H04Q 9/00* | (2006.01) |

(52) U.S. Cl.
CPC ............ *G01M 3/165* (2013.01); *E04D 11/02* (2013.01); *E04D 13/006* (2013.01); *G01K 1/024* (2013.01); *G01N 27/048* (2013.01); *H04Q 9/00* (2013.01); *H04Q 2209/10* (2013.01); *H04Q 2209/40* (2013.01); *H04Q 2209/88* (2013.01)

(58) Field of Classification Search
None
See application file for complete search history.

(56) References Cited

U.S. PATENT DOCUMENTS

| | | | |
|---|---|---|---|
| 10,970,991 B1 | 4/2021 | Alovert | |
| 2007/0262781 A1* | 11/2007 | Geisel | G01N 27/121 324/649 |
| 2018/0041874 A1* | 2/2018 | Kelly | H04W 84/18 |
| 2018/0202163 A1* | 7/2018 | Vokey | G01D 5/165 |

FOREIGN PATENT DOCUMENTS

CN    205050168    2/2016

* cited by examiner

*Primary Examiner* — Walter L Lindsay, Jr.
*Assistant Examiner* — Geoffrey T Evans
(74) *Attorney, Agent, or Firm* — Adrian D. Battison; Ade & Company Inc.; Ryan W. Dupuis (57) ABSTRACT

A leak in the membrane of a generally horizontal roof support deck includes dividing the membrane into separate zones and locating a sensor to detect moisture underneath the membrane. A movable scanning device carried by a worker has a power supply antenna for supplying power by an electromagnetic wave to the sensor and the worker moves the scanning device to selected ones of the zones. At each selected zone the power supply antenna activates the sensor in the zone and the sensor to emits signals related to the moisture underneath the membrane as detected by the sensor device which are detected and recorded at the mobile scanning device.

17 Claims, 7 Drawing Sheets

ZONED ROOF MONITORING SYSTEM

The present invention relates to a system for monitoring moisture intrusion in roofing and waterproofing systems for the presence and location of moisture penetration. It has particular application to monitoring low-slope and flat roofs of residential and commercial buildings for undesired water ingress.

BACKGROUND OF THE INVENTION

The failure to detect, identify and correct minor roof deterioration and leakage in the earliest stages is considered the greatest cause of premature roof failure. This is particularly true of roofing materials applied on low-slope or flat roofs. Costly roofing problems are often the result of design deficiencies, faulty application, or trade damage of the roof system. Even when properly designed and applied, all roofing materials deteriorate from exposure to the weather at rates determined largely by the kind of material and the conditions of exposure. Conventional roof designs in cool climates often have water accumulation below the membrane caused by vapor drive from below.

It is known to provide a moisture sensing system arranged in separate zones of the roof where the moisture sensing system of each zone must be wired back to a central monitoring station for individual monitoring. The wiring requirements for such a system are very onerous and prone to damage.

SUMMARY OF THE INVENTION

One object of the present invention is to provide a method for monitoring leaks in flat or low slope roofing and waterproofing systems which have an impermeable membrane applied at the top most layer of the assembly where the complexity of wiring requirements is reduced.

In a first aspect of the invention, all the sensing systems are connected to a single power and signaling cable using a daisy chain method. The cable contains a pair for the serial bus, a pair for powering and a pair for a locate tone signal.

According to a first definition of this invention there is provided a method of detecting a leak in a roof, wherein the roof comprises a generally horizontal roof support deck with a water impermeable membrane applied on top of the roof assembly, the method comprising:

dividing the membrane into a plurality of separate zones;
in each zone applying at or adjacent the membrane a sensor device arranged to detect moisture underneath the membrane;
the sensor device in each zone including remote measurement and signaling electronics;
assigning a unique digital code address to each of the remote measurement and signaling electronics;
connecting inputs of the remote measurement and signaling electronics of the sensor devices to a single power and signaling cable system using a daisy chain;
terminating the signalling cable system in a serial bus controller;
and using the serial bus controller to interrogate each of the sensor devices using the address to identify zones where moisture is detected.

According to a second definition of this invention there is provided a method of detecting a leak in a roof, wherein the roof comprises a generally horizontal roof support deck with a water impermeable membrane applied on top of the roof assembly, the method comprising:

dividing the membrane into a plurality of separate zones;
in each zone applying under the membrane a sensor device;
wherein the sensor device includes sensors arranged to detect moisture underneath the membrane, humidity in a location surrounding the sensor device and temperature in a location surrounding the sensor device.
the sensor device in each zone including remote measurement and signaling electronics.

According to a third definition of this invention there is provided a method of detecting a leak in a roof, wherein the roof comprises a generally horizontal roof support deck with a water impermeable membrane applied on top of the roof assembly, the method comprising:

dividing the membrane into a plurality of separate zones;
in each zone applying at or adjacent the membrane a sensor device arranged to detect moisture underneath the membrane;
the sensor device in each zone including remote measurement and signaling electronics;
wherein each sensor device includes an antenna for emitting a location signal and a switching device for activating the antenna.
where a locate tone signal, on command at the sensor device, the is switched on at the sensor device to energize the antenna of the sensor device;
and wherein, on detection of moisture by a sensor device, the locate tone is switched on to the respective antenna of the sensor device and a technician locates from above the membrane the sensor device emitting the tone signal using a locate receiver.

According to a fourth definition of this invention there is provided a method of detecting a leak in a roof, wherein the roof comprises a generally horizontal roof support deck with a water impermeable membrane applied on top of the roof assembly, the method comprising:

dividing the membrane into a plurality of separate zones;
in each zone applying at or adjacent the membrane a sensor device arranged to detect moisture underneath the membrane;
the sensor device in each zone including remote measurement and signaling electronics;
assigning a unique digital code address to each of the remote measurement and signaling electronics;
connecting inputs of the remote measurement and signaling electronics of the sensor devices to a single power and signaling cable system using a daisy chain;
terminating the signalling cable system in a serial bus controller;
wherein the serial bus controller includes built in loop verification testing.

Preferably each sensor device also includes a sensor for humidity in a location surrounding the sensor device and preferably each sensor device also includes a sensor for temperature in a location surrounding the sensor device. Sensors for detecting these parameters are commercially available and can be attached readily to the sensor device at the respective zone for communication therewith as required based on signals from the sensor device to provide a reading when instructed.

In a preferred arrangement for use with external communication, the serial bus controller is driven by a microprocessor controller which is connected to a remote server through an internet gateway.

Preferably the serial bus controller includes built in loop verification testing.

Preferably the signalling cable system contains a conductor pair for the serial bus for communication with the sensor devices and a conductor a pair for powering the sensor devices.

In the preferred method, the sensor devices are interrogated from a remote monitoring station reading moisture levels in a location surrounding the sensor device and mapping the levels onto a chart for analysis.

In an important feature, each sensor device includes an antenna for emitting a location signal and a switching device for activating the antenna. In this way a locate tone signal is provided and, on command at the sensor device, the locate tone is switched on at the sensor device to energize the antenna of the sensor device. This allows the technician to locate the sensor device at the membrane surface so as ensure there are no location errors when a sensor device is triggered for further analysis. That is, before an excavation of the roof membrane is ordered to determine the reason for a potential leak, the actual location of the triggered sensor device is checked manually using a utility locate receiver which responds to the signal from the antenna. It will be appreciated that signalling or wiring errors could mislocate the sensor device so that it is not at the position on the roof membrane where it is expected or intended to be. In this case, the mislocation can be found and the actual zone concerned investigated by excavation.

Thus preferably the signalling cable system includes a dedicated conductor pair for the locate tone signal to be communicated to all of the sensor devices. Thus, on detection of moisture by a sensor device, the locate tone can be switched on to the respective antenna of the sensor device and a technician locates from above the membrane the sensor device emitting the tone signal using a locate receiver. Such receivers are readily commercially available and include a wand which is responsive to the frequency emitted by the antenna. The devices are often used to locate utility lines and are associated with a transmitter to apply the signal to the utility line. In this case the signal is applied centrally through the daisy chain to all of the sensor devices.

In one preferred embodiment which can be used with the arrangements described above or as described below, the moisture is sensed by each sensor device by applying to the roof in a location underneath the membrane and on top of a roof deck at least one length of a moisture detection sensor tape arranged to detect moisture in between the deck and the membrane. In this case, the moisture detection sensor tape can comprise a substrate of a dielectric material carrying first and second elongate, parallel, conductors secured to one surface of the substrate and moisture is sensed by a sensing system detecting changes in resistance between said first and second conductors of said at least one length so as to detect moisture permeating into the respective zone in the location between the membrane and the roof deck. Preferably the length or lengths of the tape are arranged in a two-dimensional array such as at right angles so as to span across the zone with the sensor device itself at an intersection of the lengths at the center of the zone. That is the zones may be rectangular and each of the first and second lengths spans across the zone passing substantially through a center of the zone, either diagonally or parallel to sides of the zone. The zones can then be arranged in an array of rows and columns. The moisture sensor tapes of each zone are preferably electrically separated from the lengths of each of the other zones so that each zone is independent.

The arrangement described in detail herein includes the steps of:
Laying out the roof assembly in a zoned construction whereby a dedicated moisture detection, temperature and humidity sensor is placed on the vapor barrier within each zone to detect any moisture intrusion into the zone;
Locating remote measurement and signaling electronics (RMSE) at every location in the roof assembly where moisture detection sensors are located for monitoring a selected zone;
Assigning a unique digital code address to each of the remote measurement and signaling electronics installed in the zones;
Connecting the dedicated sensors to the inputs of the remote measurement and signaling electronics at each zone location;
Connecting all the RMSEs to a single power and signaling cable using a daisy chain method with built in loop verification testing. The cable contains a pair for the serial bus, a pair for powering and a pair for a locate tone signal;
Terminating the start of the cable system in a serial bus controller driven by a microprocessor controller which is connected to a remote server through an internet gateway.
Accessing and interrogating the RMSE from a remote monitoring station reading the moisture levels, temperature, and humidity levels and mapping them onto a chart for analysis;
Placing a 32 KHZ tone place on a designated cable pair and on command from the monitoring station, the tone is switched on at the RMSE to energize the locate coil incorporated in RMSE. A technician can then locate the mislocated unit using a utility locate receiver.

In a second aspect of the invention, the system incorporates a hand-held scanning unit which generates a powering field which energizes a sensor system located in the roof or wall assembly. Once energized, the sensor and scan unit communicate using a UHF low power transceiver system. On command, moisture, and optionally temperature and humidity readings, are taken and transmitted to the scanning unit for display and storage.

According to a definition of this invention there is provided a method of detecting a leak in a roof, wherein the roof comprises a generally horizontal roof support deck with a water impermeable membrane applied on top of the roof assembly, the method comprising:
dividing the membrane into a plurality of separate zones;
in each zone applying at or adjacent the membrane a sensor device arranged to detect moisture underneath the membrane;
providing a movable scanning device having a power supply antenna for supplying power by an electromagnetic wave to the sensor device;
moving the scanning device to selected ones of the zones;
at each selected zone causing the power supply antenna to supply power to the sensor device in the zone;
using the power supplied, causing the sensor device to emit signals related to the moisture underneath the membrane as detected by the sensor device;
and detecting the signals at the mobile scanning device.

Thus preferably each sensor device is unpowered and unconnected to power supply wires and the sensor devices provide a wireless moisture measuring system.

In the preferred arrangement, the antenna uses a low frequency resonant antenna system in the scanning unit and the sensor device to energize a sensor measurement circuit to detect the moisture underneath the membrane. The low frequency energizing signal can be modulated to communicate and transmit data between the scanning and sensor unit. When energized, the sensor device can communicate with the scanning unit via UHF transceivers employed in both the scanning unit and sensor device.

On command from the scanning unit, the sensor device can take resistance readings on a moisture detection tape and transmits the data to the scanning unit.

The sensor device typically transmits the data to the scanning unit for display and storage for future analysis.

While the system can operate simply to monitor moisture penetration, in some cases each sensor device also includes a sensor for humidity in a location surrounding the sensor device and/or a sensor for temperature in a location surrounding the sensor device.

The scanning unit is manually portable to be moved from one zone to another zone.

This arrangement provides the ability to monitor and read moisture humidity and temperature (MHT) readings from sensors which are imbedded in building structure to monitor the performance of the building envelope and roof structure. A portable interrogation unit generates an electromagnetic field which transmits energy to an antenna located near the MHT sensors which is then rectified and powers up the sensor electronics to initiate the measurement sequence. As the MTH readings are made the sensor circuit passes the information to a radio frequency data transmitter and antenna which transmits the readings to the interrogation unit. The MTH readings are the displayed on the viewer display and stores the data in memory with a location number and time stamp for further analysis.

The membrane may be loose laid, mechanically attached or fully adhered.

Thus the arrangement described in detail herein provides a leak detection system by applied a pair of electrically conductive sensing elements on the surface of the vapor barrier or roof deck in an individually zoned cross grid zone detection pattern so as to be in electrical communication with any moisture that reaches the lower roof assembly.

The measurement system, on remote command, takes readings from the zones and forwards the readings preferably via an internet gateway to a cloud-based monitoring center for analysis. The individual grid sections are measured time stamped and logged with the resultant readings mapped onto an as-built drawing of the roof assembly. A color-coded map can be overlaid on the drawing of the building to provide an intuitive overview of the roof condition. If a leak occurs, stored measurements can be used to determine the location of the first zone that went into alarm.

According to a further definition of the invention there is provided an apparatus for detecting a leak in a roof, wherein the roof comprises a generally horizontal roof support deck with a water impermeable membrane applied on top of the roof assembly, the apparatus comprising:
 a sensor device arranged to detect moisture underneath the membrane;
 the sensor device comprising a moisture sensing component responsive to presence of moisture to generate a change in signal indicative of the presence of the moisture;
 the sensor device comprising a control component arranged to receive the signal and for generating a communication signal for transmission to a remote location;
 the sensor device including an antenna operable to transmit a location signal to a receiver positioned above the membrane.

BRIEF DESCRIPTION OF THE DRAWINGS

Embodiments of the invention will now be described in conjunction with the accompanying drawings in which.

DETAILED DESCRIPTION

Figure 1:
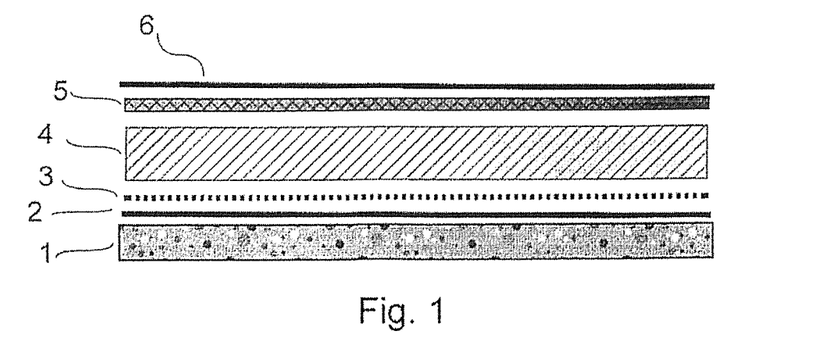
FIG. 1 is an exploded schematic cross-sectional view of a typical conventional roof assembly

A cross-sectional view of a typical conventional roof assembly is shown in FIG. 1. The structural deck 1 which supports the rest of the roof assembly is covered with a vapor barrier 2. Placed immediately above and on top of the vapor barrier is the moisture detection system detection conductors 3 in a zoned X and Y configuration shown best in FIG. 3. Thermal insulation 4 is installed above the vapor barrier then a protection board 5 is installed above the thermal insulation 4. The water impervious membrane 6 is then installed on top of the protection board to complete the assembly. The detection system is placed on top of the vapor barrier as this is where any moisture will tend to migrate.

Figure 2:
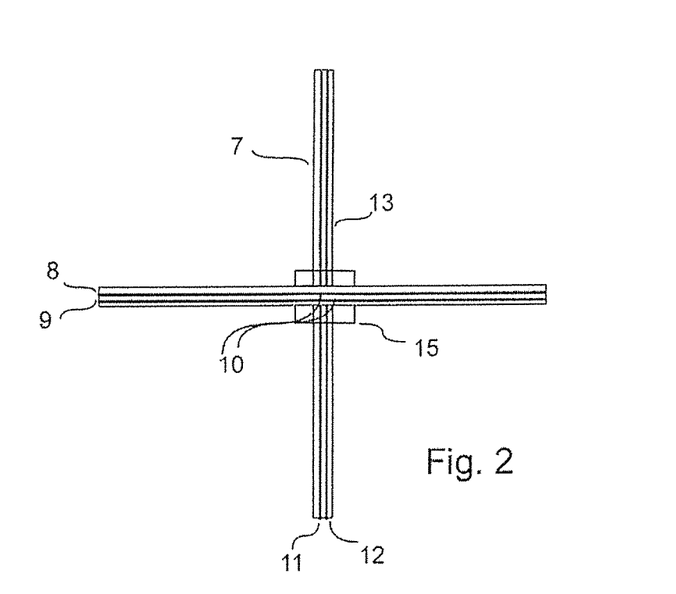
FIG. 2 is an illustration in plan of an X and Y sensor zone using detection tape with two flat conductors joined at the intersection of the tapes

Referring to FIG. 2, an X and Y detection zone using moisture detection tape with flat conductors is shown. The detection tape 7 is placed in the roof assembly in a cross configuration where the tip conductors 8, 11 and the ring conductors 9, 12 are spliced together at the tape intersection 13 and connected to the sensing device 15. The length of the detection tape 7 defines the grid spacing for the detection system. The shorter the tape section the tighter the zoned grid pattern which subsequently increases the sensitivity and leak location resolution of the system.

Figure 3:
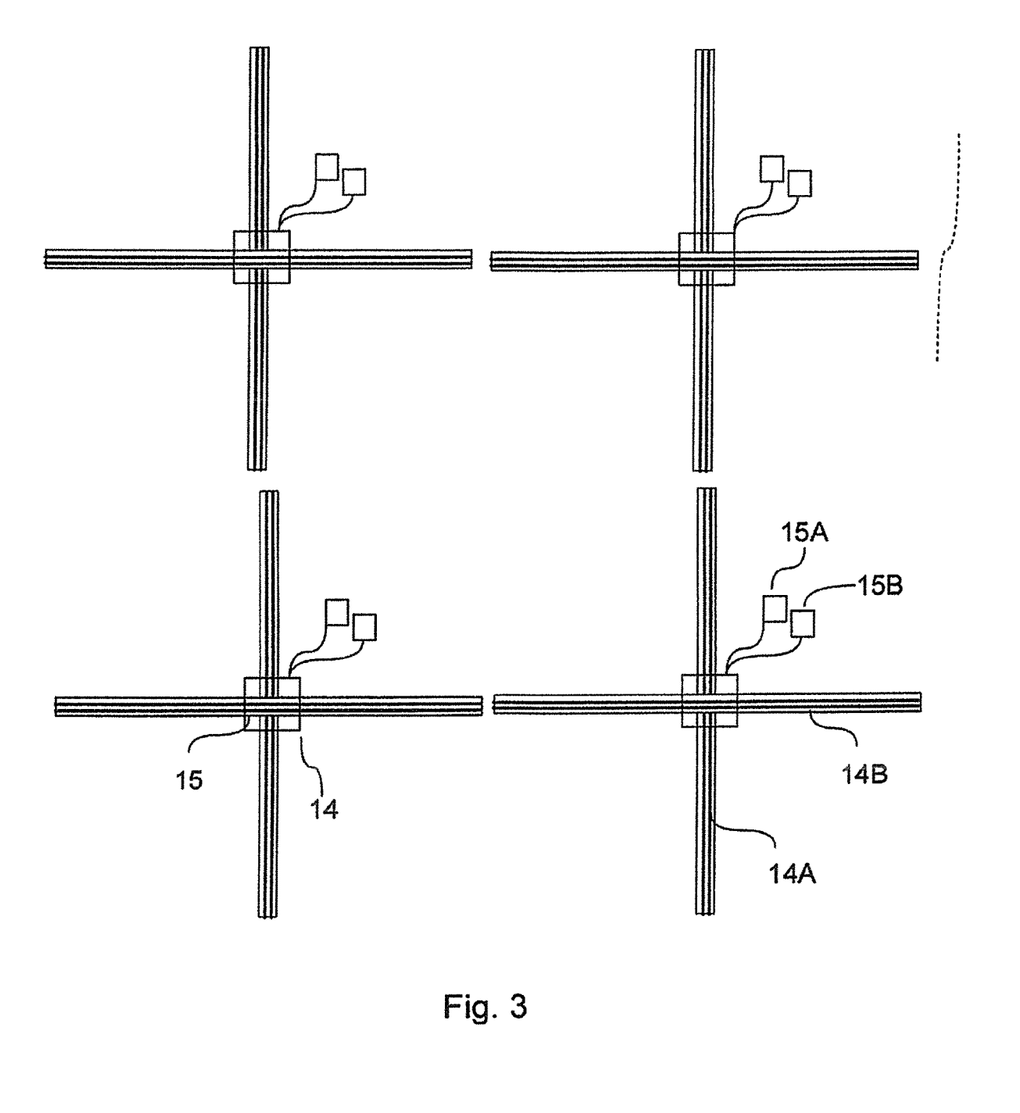
FIG. 3 is a schematic plan view showing multiple zones for connection to a central monitoring unit.
Figure 4:
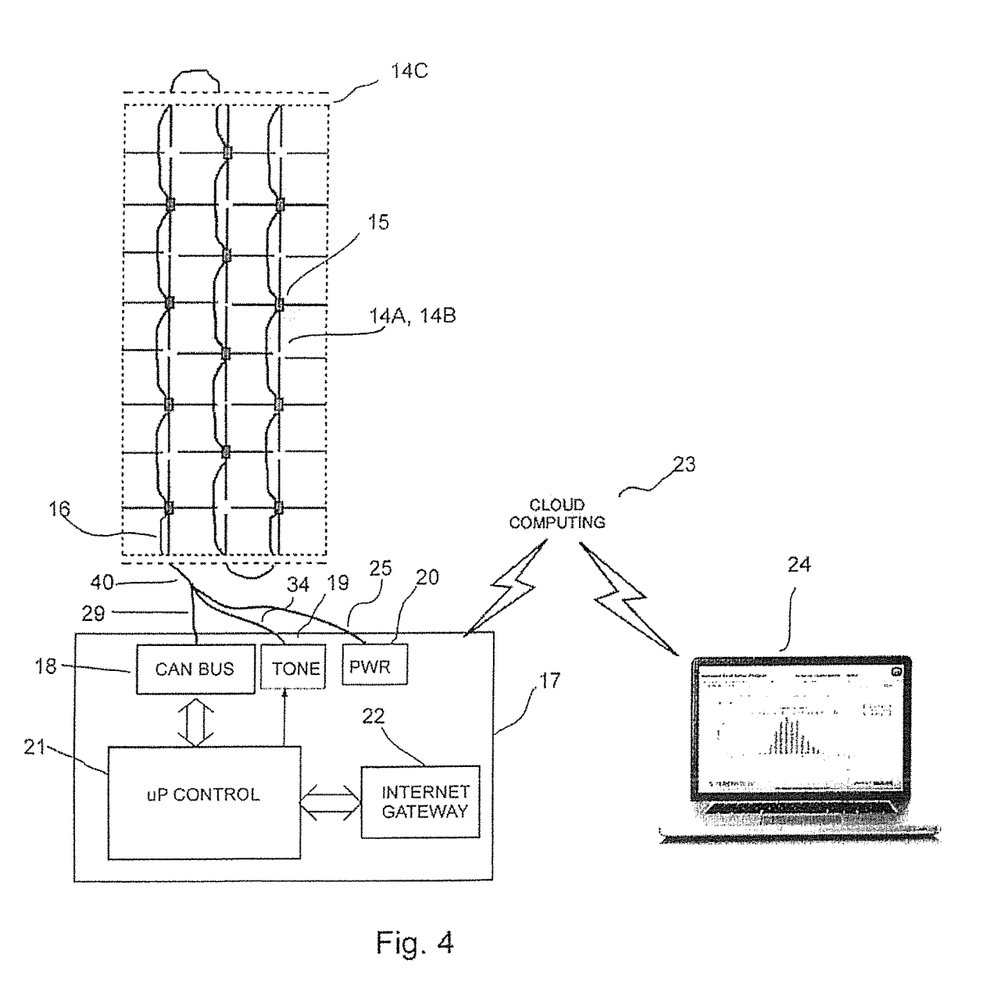
FIG. 4 is a circuit schematic showing one embodiment according to the present invention of an arrangement for monitoring all of the zones.

FIG. 3 provides a simple schematic illustrating the zone configuration and wiring connection along with a block diagram shown in FIG. 4 of the measurement system and Internet connection. The X and Y detection zones 14, are placed directly on the vapor barrier. The tip and ring detection tape conductors are connected together at the sensing device 15.

The sensor tape is of laminated construction with the preferred configuration having a substrate of high-dielectric strength and two flat copper conductors 11, 13 and 8, 9 adhered to the dielectric substrate 20. The high-dielectric strength substrate provides mechanical strength and electrical insulation from the surface it is applied to. The substrate is coated with a pressure sensitive mounting adhesive that provides adequate adhesion to standard building materials such as wood, wood laminates, concrete, steel, galvanized steel, PVC, ceramic, etc for attachment to the vapor barrier 2. The adhesive backing is desirably non-water soluble and selected to provide good adhesion characteristics over the anticipated application temperature range, e.g. −10° C. to +50° C. The adhesive backing is protected prior to installation by a peel-off release layer (not shown). A protective non-hygroscopic dielectric layer over the conductors provides mechanical and insulating properties such that contact with metal surfaces does not cause a short circuit across the conductors while allowing water to penetrate to the conductor surfaces and bridge the gap between the conductors.

The conductors are preferably flat metal strips typically no less than 6.5 mm wide and spaced apart by a distance no less than 13 mm, preferably 13.6 mm.

FIG. 3 demonstrates a cross grid detection zone using moisture detection tape with flat conductors is shown. The detection tape is placed in the roof assembly in in a cross configuration, see FIG. 3 for layout of multiple cross grid detection zones. It will be noted that the two sensing tapes 14A and 14B are arranged at right angles and intersect at the middle of the zone.

The sensing device is also connected to a humidity sensor 15A and to a temperature sensor 15B. Thus the sensing device 15 in each zone can be used to detect the presence of moisture using the tapes 14A and 14B and also the temperature and humidity. The sensors are interrogated as required by the sensor device so that the sensor device receives data as required for communication to the central control shown in FIG. 4.

Referring to FIG. 4 a portion of a roof assembly is shown with a zoned area 14C with remote monitoring sensor and signaling electronics defining the sensor device 15 installed on the vapor barrier or roof deck. The moisture detection sensor 14A, 14B is placed along the width and length of the zone with the RMSE 15 located in the center of the zone 14 and the sensors connected to an input of the RMSE 15. All the zones are daisy chain connected using a multi pair cable 16. The cable is terminated in a control panel 17 containing a CAN bus 18, tone generator 19, powering pair 20, microcontroller 21 and an internet gateway 22. The control panel 17 is connected through the gateway 22 to a cloud server 23. A monitoring site 24 is connected to the control panel 17 via the cloud sever through the internet. At the monitoring site 24 sensor date is downloaded displayed and analyzed. When required the monitoring site can issue commands to enable the locate tone at a selected zone for further identification.

Figure 5:
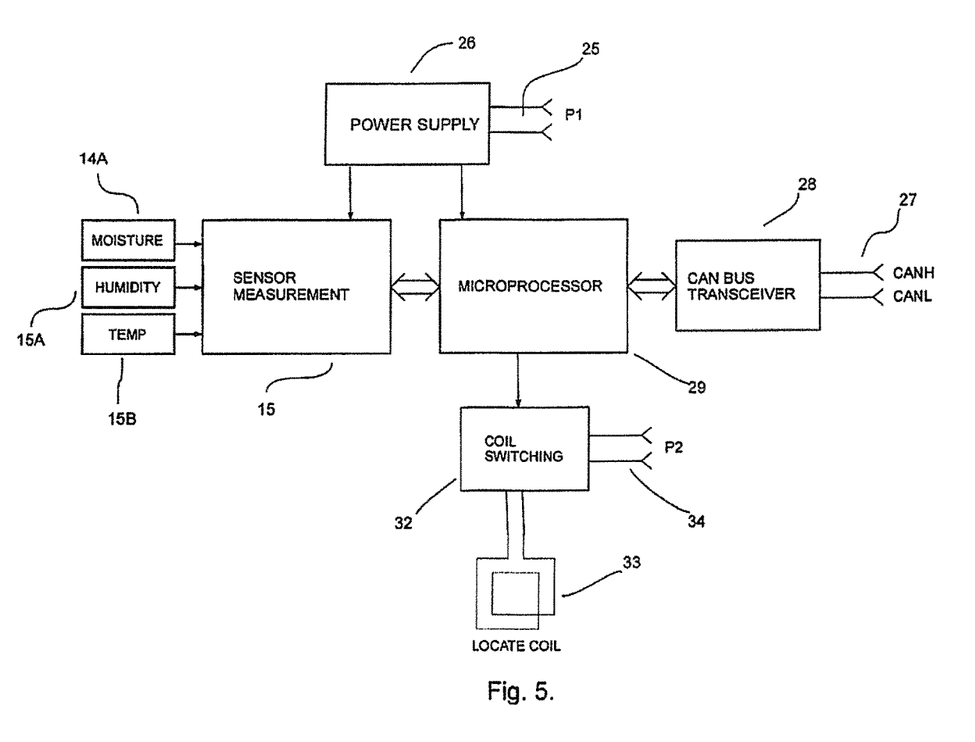
FIG. 5 is a circuit schematic showing one embodiment according to the present invention of the sensing device used in each zone.

Referring to FIG. 5, a detailed arrangement of the remote measurement and signaling electronics is illustrated. A powering pair 25 of the connecting cable supplied by power supply 20 terminates on the power supply circuit 26 of the sensor device 15 which powers the unit. A second pair 27 of the cable system connects the CAN bus 18 to the transceiver 28 of the unit 15. A microprocessor 29 with a unique code identity receives commands and transmits data through the CAN bus transceiver 28. On command from the microprocessor 29 using command signals from the CAN bus sensor measurement device 30 takes readings from the sensors 14A, 14B, 15A and 15B and sends the information to the microprocessor 29 for transmission.

In order to provide remote locating of the sensor unit 15 in the respective zone 14 to ensure that the sensor unit believed to be signalling a water penetration is actually at the location expected, when commanded on the CAN bus from the central unit, the microprocessor 29 sends a signal to a coil switch 32 which acts to energize a locate coil 33 from the tone signal transmitted on a third cable pair 34 of the connecting cable.

The arrangement above thus provides a method of detecting a leak in a roof of FIG. 1, wherein the roof comprises a generally horizontal roof support deck with a water impermeable membrane applied on top of the roof assembly As shown above, the total area of the membrane 6 to be monitored is divided into a plurality of separate zones 14 and in each zone a sensor device 15 arranged to detect moisture is positioned underneath the membrane 6.

The sensor device 15 in each zone includes remote measurement and signaling electronics shown in FIG. 5. Each unit 15 is assigned a unique digital code address form communication on the CAN bus 18. The CAN bus system allows the connection of all of the units 15 including the remote measurement and signaling electronics of the sensor devices to a single power and signaling cable system generally indicated at 40 defined by the pairs 25, 27 and 34 using a daisy chain arrangement. The signalling cable system 40 is terminated in the serial bus controller which is used to interrogate each of the sensor devices on the daisy chain connection using the address to identify zones where moisture is detected.

The serial bus controller 21 includes built in loop verification testing. A The distal end of the signalling cable 40 the can bus cable 29 is terminated in a 120 ohm resistor (not shown) which terminates the pair electrically for both impedance matching and cable continuity testing.

The signalling cable system 40 contains a conductor pair 29 for the serial bus for communication with the sensor devices and a conductor a pair 25 for powering the sensor devices.

In this way, the sensor devices are interrogated from the remote monitoring station 17 reading moisture levels in a location surrounding the sensor device 15 and mapping the levels onto a chart 24 for analysis.

A further embodiment is shown in FIGS. 6 to 11.

Figure 6:
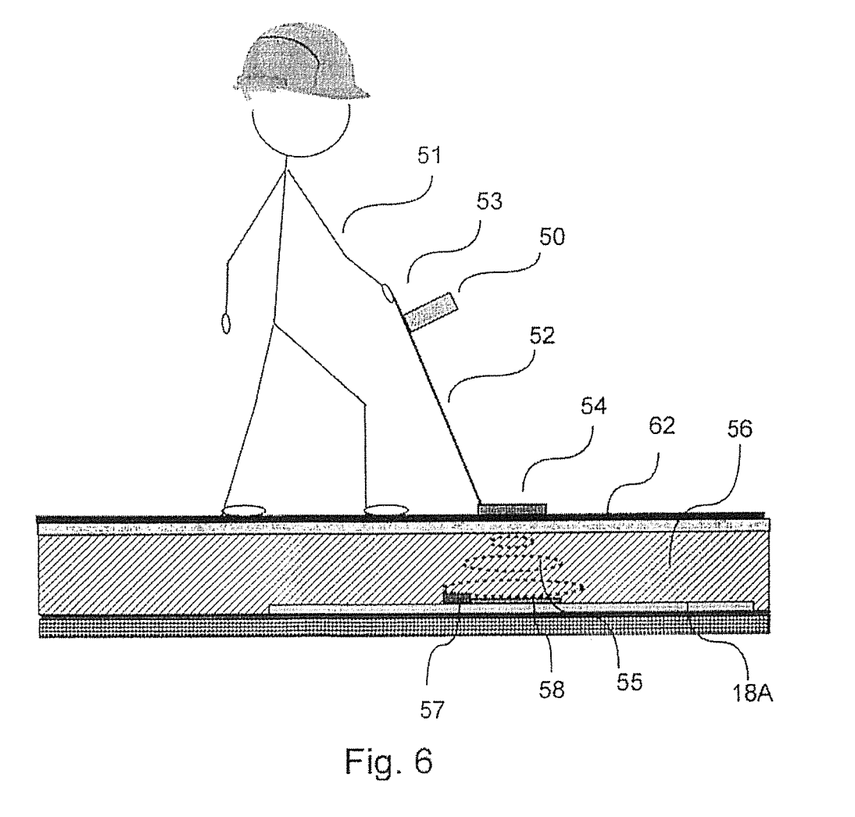
FIG. 6 is a schematic illustration showing another embodiment according to the present invention of an arrangement for monitoring all of the zones and showing the roof structure of FIG. 1 using a manually portable scanning device.

In this embodiment, a moisture detection sensor 57 is mounted underneath a membrane of a flat roof assembly shown at 56 and as described above in relation to FIG. 1. The sensor 57 includes a moisture detection system using the moisture responsive tapes 14A and 14B as described above and optionally the humidity and temperature sending components 15A and 15B also as described above. The sensor 57 also includes a control circuit 55 which operates to receive the signals from the moisture, temperature and humidity sensors as required or when interrogated for communication to a remote location.

In this embodiment the signals from the control circuit 55 are communicated to the remote location by a wireless hand-held scanning system 52. The hand-held device 52 includes a handle 53 with scanning electronics circuitry mounted in a top portion 50 and a transmitting and receiving antenna 54 mounted at or adjacent the bottom so as to be close to the top surface of the membrane. The device 52 is held and supported by a technician 51 carrying the device. However wheeled units can also be used.

The moisture detection sensor 57 with a sensing and transceiver circuit 55 is connected to the powering and transmitting antenna 58. The scanning unit 52 transmits a powering signal 54A, typically at around 125 KHz, and simultaneously controls and communicates signals to and from a sensor transceiver component of the sensor 57, typically at around 915 MHz.

Figure 7:
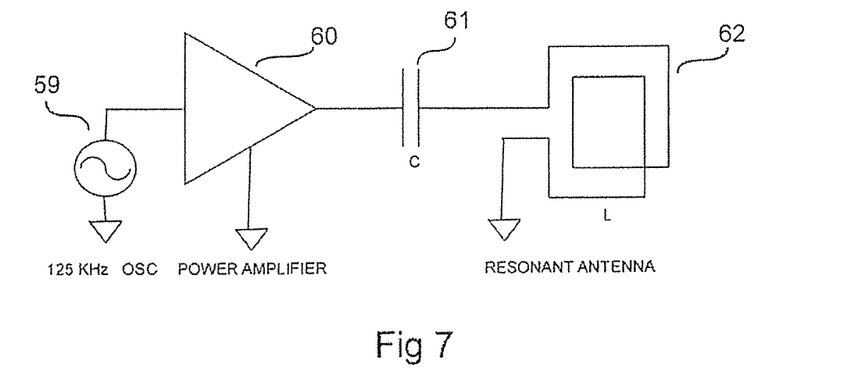
FIG. 7 is a circuit schematic showing a powering transmitter supply circuit of the scanning device of FIG. 6.

FIG. 7 illustrated the 125 KHz powering transmitter circuit of the hand held device 52 where a 125 KHz oscillator 59 drives the input to a class E power amplifier 60 which is coupled to a resonant antenna circuit through a coupling capacitor 61 with a capacitance of C. An output antenna 62 comprises a loop antenna with an inductance of L so that the series circuit LC is selected to resonate at the 125 KHz powering frequency. At resonance, the antenna 62 creates the maximum inductive field 54A which couples to the powering antenna 58 of the sensor unit 57.

Figure 10:
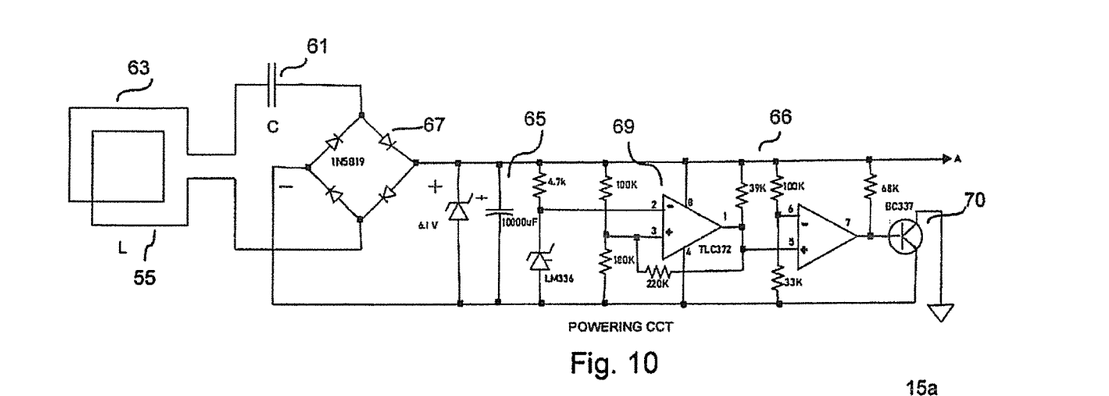
FIG. 10 is a circuit schematic showing the powering circuit of the sensing device of FIG. 6.

FIG. 10 details the circuit which powers the sensor unit 57 including the microprocessor and transceiver 55. The powering antenna 58 consists of the inductive loop 63 and the series capacitor 61 that is resonant at 125 KHz and is energized by the scanner antenna 62 of the unit 57. The powering circuit 66 includes a full wave bridge rectifier 67 a storage capacitor 68 and a Schmitt trigger 69. When the storage capacitor 68 reaches five volts the Schmitt trigger 69 turns on a transistor 70 energizing the entire circuit. Once energized the resistance measuring circuit 71, shown in FIG. 9, reads the resistance of the moisture detection tapes 14A, 14B which is connected across the input 72 which is proportional to the moisture in the respective zone 14. The circuit 71 provides an output 74 which is indicative of the moisture sensed by the tapes. This is converted to a digital signal by an A/D circuit 81.

Figure 8:
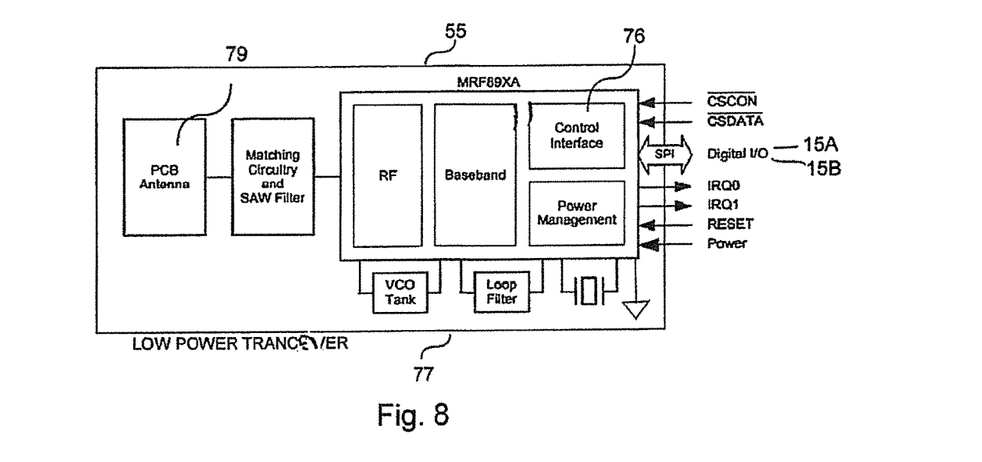
FIG. 8 is a circuit schematic showing the transceiver circuit of the scanning device and the sensing device of FIG. 6.
Figure 9:
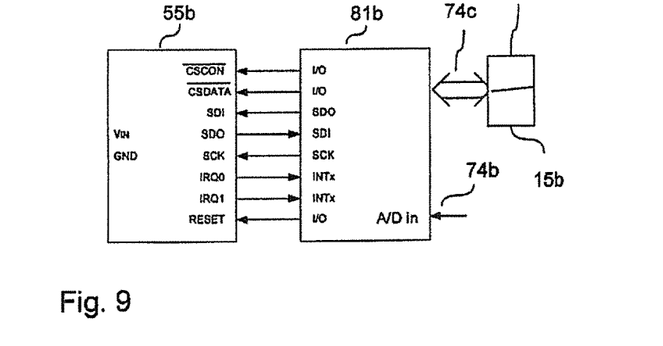
FIG. 9 is a circuit schematic showing the measuring circuit of the sensing device of FIG. 6.

The structure of the sensing unit 55 is shown in FIG. 8. The structure of the hand-held unit 52 is shown in FIG. 11.

The analog output 74 of the measuring circuit 72 is supplied to an A/D input 74b of the microprocessor 18b is sent to the transceiver 77 of the sensing unit 55. The transceiver 77 of the sensor unit 55 communicates with the transceiver 78 of the hand-held unit 78.

Each of the transceivers 77 and 78 includes a transmission antenna 79, 80 which is a pc-based antenna and acts to transmits the digital data between the two transceivers.

Figure 11:
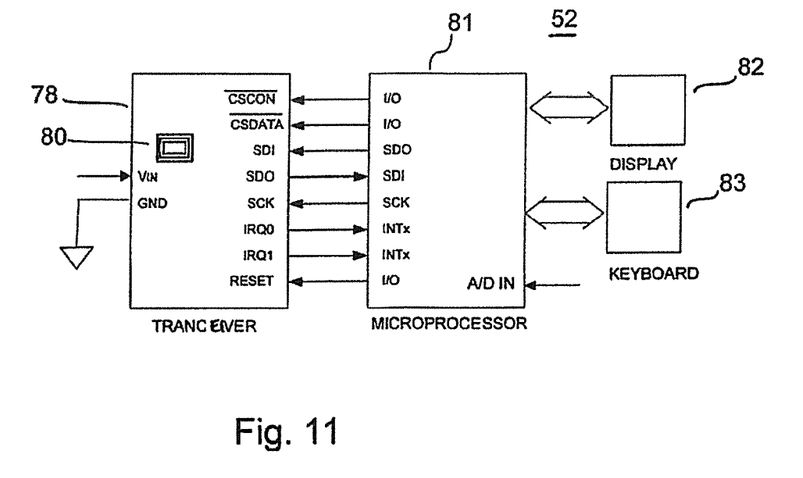
FIG. 11 shows the transceiver for the scanning unit of FIG. 6 including a display and keyboard operable by the worker

The transceiver 78 and microprocessor control 81 of the hand-held unit 52 as shown in FIG. 11 receive and manage the data transmitted including interrogating signals and data signals providing the required moisture penetration data. The received data is presented on a display 82. A keyboard 83 is used to store the data in memory and call up other test results such as the temperature and humidity sensors 15A and 15B, when installed on the sensor unit, in a serial bus configuration 74C.

This system therefore incorporates a hand-held scanning unit 52 which generates a powering field in the antenna 54 which energizes the antenna 58 of the sensor system 55 located in the roof or wall assembly. Once energized, the sensor and scan unit communicate using a UHF low power transceiver system 77, 78 using antennas 79 and 80. On command, moisture, and optionally temperature and humidity readings, are taken and transmitted to the scanning unit 52 for display and storage.

The method of detecting a leak in a roof in this embodiment includes in each zone installing during application the membrane at or adjacent the membrane the sensor device 55 arranged to detect moisture underneath the membrane.

The movable scanning device includes the power supply antenna 62 for supplying power by an electromagnetic wave to the input power supply circuit 66 shown in FIG. 10 of the sensor device 57 using the input antenna 58.

When required, for example for periodic assessment or maintenance, the scanning device is transported by the technician to select one of the zones. Typically, the technician will scan all zones in a pattern corresponding to the array as laid out during installation. When the hand-held device passes over or moves adjacent to a respective one of the sensor devices, the power supply signal from the antenna of the hand-held device acts to power up the sensing device which is otherwise unpowered and dormant. The sensing device then responds with a signal from the transceiver which is received by the transceiver of the hand-held device and provides an output audible or visible by the technician to indicate location of the zone and its associated sensing device.

Using the power supplied, the sensor device acts to emit signals related to the detection of the presence of or level of moisture underneath the membrane as detected by the measuring tapes of the sensor device. The signals are detected at the mobile scanning device and relayed to the technician on the display or to be recorded. In this way the status of the roof membrane can be monitored periodically as required to detect any water penetration and the extent of that penetration.

Thus each sensor device is unpowered and unconnected to power supply wires and the sensor devices provide a wireless moisture measuring system. This avoids the necessity to provide wiring arrangements when the roof is installed which can become damaged or may be improperly installed thus losing contact with one or more of the sensors.

The antenna uses a low frequency resonant antenna system in the scanning unit and the sensor device to energize a sensor measurement circuit to detect the moisture underneath the membrane. If desirable, and in a different circuit arrangement, the low frequency energizing signal can be modulated to communicate and transmit data between the scanning and sensor unit.

When energized, the sensor device communicates with the scanning unit via UHF transceivers 77 and 78 employed in both the scanning unit and sensor device.

While the system can operate simply to monitor moisture penetration, in some cases each sensor device also includes a sensor 15A for humidity in a location surrounding the sensor device and/or a sensor 15B for temperature in a location surrounding the sensor device.

The invention claimed is:

1. A method of detecting a leak in a roof, wherein the roof comprises a generally horizontal roof support deck with a water impermeable membrane applied on top of the roof support deck, the method comprising:
    dividing the membrane into a plurality of separate zones;
    in each zone applying at or adjacent the membrane a sensor device arranged to detect moisture underneath the membrane;
    providing a movable scanning device having a power supply antenna for supplying power by an electromagnetic wave to the sensor device;
    moving the scanning device to selected ones of the zones;
    wherein in each respective zone, at least one length of a moisture sensor detection tape arranged to detect moisture underneath the membrane is applied at or adjacent the membrane;
    where said at least one length of the moisture detection tape has conductors arranged so that a resistance between the conductors is proportional to moisture in the respective zone;
    wherein in each zone the sensor device includes measurement and signaling electronics to take resistance readings from said at least one length of the moisture detection tape which are proportional to moisture in the respective zone;

at each selected zone causing the power supply antenna to supply power to the sensor device in the respective zone;

using the power supplied, causing the sensor device to emit signals related to the moisture underneath the membrane as detected by the sensor device;

and detecting the signals at the mobile scanning device.

2. The method according to claim 1 wherein each sensor device is unpowered and unconnected to power supply wires.

3. The method according to claim 1 wherein the sensor devices provide a wireless moisture measuring system.

4. The method according to claim 1 wherein the antenna uses a low frequency resonant antenna system in the scanning device.

5. The method according to claim 1 wherein the low frequency energizing signal is modulated to communicate and transmit data between the scanning device and the sensor device.

6. The method according to claim 1 wherein, when energized, the sensor device communicates with the scanning device via UHF transceivers employed in both the scanning device and sensor device.

7. The method according to claim 1 wherein, on command from the scanning device, the sensor device takes resistance readings on a moisture detection tape and transmits the data to the scanning device.

8. The method according to claim 1 wherein the sensor device transmits the data to the scanning device for display and storage for future analysis.

9. The method according to claim 1 wherein each sensor device also includes a sensor for humidity in a location surrounding the sensor device.

10. The method according to claim 1 wherein each sensor device also includes a sensor for temperature in a location surrounding the sensor device.

11. The method according to claim 1 wherein said at least one length of the moisture detection tape is arranged in a two-dimensional array.

12. The method according to claim 1 wherein the said at least one length of the moisture detection tape of each zone is electrically separated from said at least one length of the moisture detection tape of each other of the zones.

13. The method according to claim 1 wherein said at least one length of the moisture detection tape comprises at least first and second lengths arranged to lie in different directions in the zone.

14. The method according to claim 13 wherein the zones are rectangular and each of the first and second lengths spans across the zone passing substantially through a center of the zone, either diagonally or parallel to sides of the zone.

15. The method according to claim 1 wherein the scanning device is manually portable to be moved from one zone to another zone.

16. An apparatus for detecting a leak in a roof, wherein the roof comprises a generally horizontal roof support deck with a water impermeable membrane applied on top of the roof support deck, the apparatus comprising:

a sensor device arranged to detect moisture underneath the membrane;

the sensor device comprising a moisture sensing component responsive to presence of moisture to generate a change in signal indicative of the presence of the moisture;

wherein said moisture sensing component comprises at least one length of a moisture sensor detection tape arranged to detect moisture underneath the membrane is applied at or adjacent the membrane;

where said at least one length of the moisture detection tape has conductors arranged so that a resistance between the conductors is proportional to moisture underneath the membrane;

wherein the sensor device includes measurement and signaling electronics to take resistance readings from said at least one length of the moisture detection tape which are proportional to moisture underneath the membrane;

the sensor device comprising a control component arranged to receive the resistance readings and for generating a communication signal for transmission thereof to a remote location;

the sensor device including an antenna operable to transmit a location signal to a receiver positioned above the membrane.

17. The apparatus according to claim 16 wherein the sensor device also includes a sensor for humidity and/or a sensor for temperature in a location surrounding the sensor device.

* * * * *